United States Patent [19]

Beattie et al.

[11] Patent Number: 4,632,738

[45] Date of Patent: Dec. 30, 1986

[54] HYDROMETALLURGICAL COPPER PROCESS

[75] Inventors: Morris J. V. Beattie; William G. Bacon; Rein Raudsepp, all of Vancouver, Canada

[73] Assignee: Great Central Mines Ltd., Vancouver, Canada

[21] Appl. No.: 606,322

[22] Filed: May 2, 1984

Related U.S. Application Data

[63] Continuation-in-part of Ser. No. 414,726, Sep. 3, 1982, abandoned.

[51] Int. Cl.⁴ .................... C25C 1/12; C22B 15/08; C22B 15/00
[52] U.S. Cl. .................................... 204/107; 75/114; 75/117
[58] Field of Search ............... 204/107, 106, 108; 75/117, 114, 121; 210/748

[56] References Cited

U.S. PATENT DOCUMENTS

| | | | |
|---|---|---|---|
| 3,901,776 | 8/1975 | Kruesi et al. | 204/107 |
| 3,923,616 | 12/1975 | Atadan et al. | 204/107 |
| 4,159,232 | 6/1979 | Bacon et al. | 204/107 |
| 4,490,224 | 12/1984 | Warheit | 204/107 |
| 4,545,877 | 10/1985 | Hillis | 204/106 X |

OTHER PUBLICATIONS

Spiegler, K. S., *Principles of Desalination*, Academic Press, New York, 1966, p. 228.

*Primary Examiner*—John F. Niebling
*Assistant Examiner*—B. J. Boggs, Jr.
*Attorney, Agent, or Firm*—Townsend and Townsend

[57] ABSTRACT

A novel hydrometallurgical process for the recovery of copper, and optionally iron, from sulfide copper concentrates containing common copper sulfides such as chalcopyrite, bornite and chalcocite using electrowinning cells wherein the anolyte and the catholyte are separated by a solution-impermeable cation exchange membrane. The process for the recovery of copper utilizing electrowinning cells comprises leaching copper concentrate in first and second stages, the leaching in the first stage being done with a partially reduced leach liquor obtained from the second stage; separating the concentrate obtained from the first stage in a solid-liquid separator, the partially leached solids being directed to the second leaching stage, the liquid from the separator being directed to the catholyte compartment of an electrowinning cell; leaching the solids in the second leaching stage with regenerated leaching liquid obtained from the anolyte compartment of the electrowinning cell, the anolyte and catholyte compartments being separated by a membrane which is impermeable to copper chloride and iron chloride complexes but is permeable to hydrogen ions; separating the concentrate obtained from the second stage in a second solid-liquid separator, and filtering and washing the solids residue from the separator.

21 Claims, 8 Drawing Figures

HYDROMETALLURGICAL COPPER PROCESS

FIELD OF THE INVENTION

This application is a continuation-in-part of application Ser. No. 414,726, filed Sept. 3, 1982 now abandoned.

This invention is directed to a novel hydrometallurgical process for the recovery of copper and optionally, iron, from sulfide copper concentrates containing common copper sulfides such as chalcopyrite, bornite and chalcocite.

BACKGROUND OF THE INVENTION

Present copper recovery processes utilize copper smelters which inherently create a significant amount of air pollution and hence ecological harm to the environment. In recent years, there has been strong emphasis to minimize ecological damage to the environment and as a consequence certain processes have been developed for the treatment of copper concentrates to recover copper without attendant environmental problems.

U.S. Pat. No. 3,901,776, Kruesi et al., Aug. 26, 1975, discloses a copper electrowinning process which purports to separate the anolyte and catholyte compartments through the use of a microporous polypropylene film. It is doubtful that a film of the type disclosed by Kruesi et al. performs effectively because such a film is a physical barrier, rather than a chemical complex barrier, and has very small openings (of the order of 0.02 microns) through it. Such a film, since it is a diaphragm and not a true membrane, does not achieve effective separation because it allows solution and ions to pass through it, albeit at a very slow rate.

A consideration of the composition of the solution in the Kruesi et al. patent indicates plainly that solution exchange between compartments is necessary in order to allow copper electrowinning to proceed. The solution from leach 1 (see column 8) after reduction with recycled copper would contain 67.9 gpl Cu, or just over 1 molar Cu. In order to remove this copper from solution, one mole of ions must pass through the film, either as cations moving from the anolyte to the catholyte, or as anions moving from the catholyte to the anolyte. The solution is indicated to be pH =0.5 which corresponds to approximately 0.3 molar HCl. If 0.3 moles of protons pass from the anolyte to the catholyte, then it follows that 0.7 moles of charge remain to be passed to maintain a charge balance. Some of this current must necessarily be passed by the transfer of chloride ions from the catholyte to the anolyte.

The applicants have tested a film of the type disclosed by Kruesi et al. and have noted that chlorine ion transfer through the film takes place. With solutions as described by Kruesi et al. and having the anolyte and catholyte compartments separated by a CELGARD (trade mark) film, a film of the type used by Kruesi et al., the applicants have observed that after operating an electrowinning cell with such a film for only 100 hours, the polypropylene film becomes embrittled due to conversion of the polypropylene to a chlorinated polypropylene structure.

In addition to charge transfer by proton ($H^+$) and chloride ion transport, the applicants have noted that in a process of the type disclosed by Kruesi et al., additional charge transfer will occur due to the diffusion of copper and iron ions through the separator.

A hydrometallurgical process for the electrolytic recovery of selected base metals (especially copper, and optionally nickel) from sulfide ore concentrates concurrently with the extraction of metallic iron in commercially usable quantities had previously been developed by the applicant and is now the subject of U.S. Pat. No. 4,159,232, issued June 26, 1979. The process disclosed and claimed in that patent utilizes at least a primary and a secondary bank of sequentially disposed electrolytic cells, the cells of each bank being electrically connected in parallel. Each of the cells has separate anode and cathode compartments, the compartments being separated from other compartments in a bank by a permeable dividing element capable of passing electrolyte between the compartments.

A first supply of anode solution is continuously withdrawn from the anode compartments of the electrolytic cells in each bank of cells, the anode solution being an aqueous electrolyte including in solution hydrochloric acid and a soluble metal chloride. The anode solution is transported to at least one leaching vessel to continuously leach a supply of ore concentrate to one leaching vessel to reduce ferric ions in solution to their lowest valence state (ferrous). The leaching vessel generates a liquid-solid slurry output including solid residue, partially leached concentrate and leaching solution. The solids are separated from the liquid in the resulting slurry output by using a suitable solids-liquid separator. The solution from the solids-liquid separator is returned to the cathode compartments of both the primary and secondary banks of cells, with a first preselected portion of the liquid being returned to the cathode compartments of the secondary bank of cells.

Base metal is precipitated at the cathode in a non-adherent form to provide a slurry with a cathode solution. Base metal deposits are continuously withdrawn from the slurry comprising cathode solution and precipitated base metal obtained from the cathode compartments of the bank of cells. The separated cathode solution obtained from the base metal slurry is returned to the cathode compartments of both the primary and secondary bank of cells with a second pre-selected portion of the separated cathode solution being returned to the cathode compartments of the secondary bank of cell. The amounts of the first and second pre-selected portions are small enough to allow for the establishment in the cathode compartments of base metal impoverished solution areas.

The amounts of remaining separated leaching liquid and separated cathode solution returned to the cathode compartments of the primary bank of cells are large enough to avoid the development of base metal impoverished areas next to the cathode electrodes of the primary bank of cells. Base metal impoverished cathode solution is continuously withdrawn from the base metal impoverished solution areas of the cathode compartments of the secondary bank of cells. Hydrogen gas is cathodically produced from the catholyte of the electrolytic cells in each bank of cells. The base metal impoverished cathode solution is evaporated and crystallized to yield hydrated ferrous chloride. The hydrated ferrous chloride is reduced by the hydrogen gas at a selected elevated temperature to produce metallic iron. Copper is obtained from the cathode compartments of both the primary and secondary banks of cells.

In this process, it is important to note that mixing of the anolyte and the catholyte takes place across the permeable dividing element.

SUMMARY OF THE INVENTION

The present invention is directed to a process for recovery of copper and optionally iron. The process is not intended for the recovery of nickel or nickel minerals.

A significant advantage of the process is that no solids are tolerated in the electrowinning cells. Further, no solution flows from the cathode compartments to the anode compartments of the electrowinning cells. The process is also somewhat simplified compared to previous processes in that alkali metal chlorides such as sodium chloride have been eliminated from the process solutions. The hydrochloric acid concentration has been increased.

The invention is directed to a hydrometallurgical process for the recovery of copper from sulphide copper concentrate involving the use of electrowinning cells, wherein the efficiency of the electrowinning cells is increased by preventing any mixing of the anolyte and the catholyte in the electrowinning cells. The mixing of the anolyte and the catholyte is prevented by a membrane which is substantially impervious to copper chloride and iron chloride complexes but is pervious to hydrogen ions. The anolyte and catholyte are substantially free from alkali metal chlorides such as sodium chloride. No significant amount of solids is present in the electrowinning cells.

The process for the recovery of copper utilizes electrowinning cells and comprises leaching copper concentrate in first and second stages, the leaching in the first stage being done with a partially reduced leach liquor obtained from the second stage; separating the concentrate obtained from the first stage in a solid liquid separator, the partially leached solids being directed to the second leaching stage, the liquid from the separator being directed to the catholyte compartment of an electrowinning cell; leaching the solids in the second leaching stage with regenerated leaching liquid obtained from the anolyte compartment of the electrowinning cell, the anolyte and catholyte compartments being separated by a membrane which is impermeable to copper chloride and iron chloride complexes but is permeable to hydrogen ions; separating the concentrate obtained from the second stage in a second solid-liquid separator and filtering and washing the solids residue from the separator.

DRAWINGS

DETAILED DESCRIPTION OF A PREFERRED EMBODIMENT OF THE INVENTION

Figure 1:
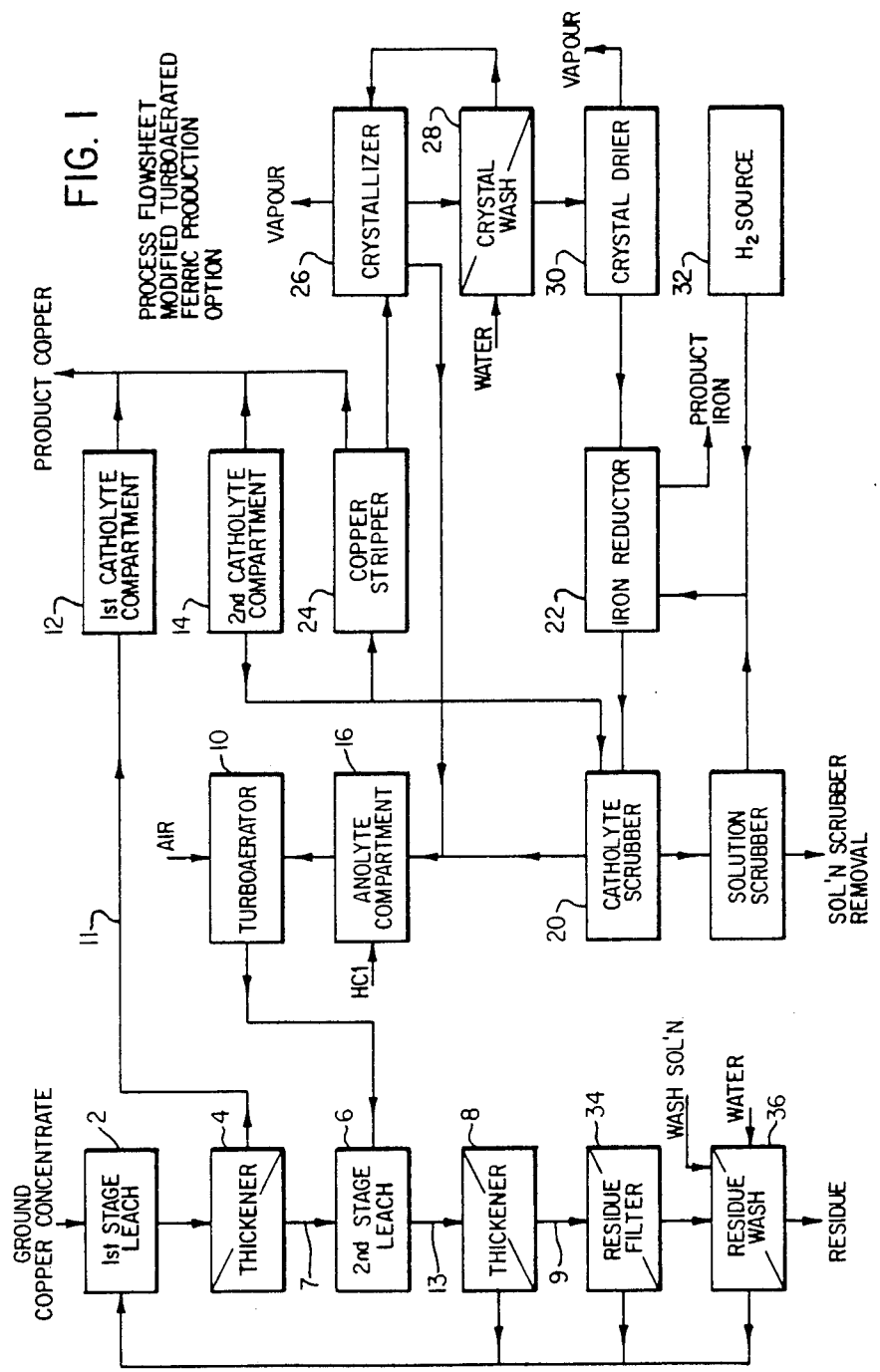
FIG. 1 represents a schematic flow sheet illustrating the copper and iron recovery process.

The applicants' process will first be described referring to FIG. 1, the preferred arrangement for leaching of the concentrate involves a two stage, countercurrent flow of solids and liquids.

Finely ground copper concentrate is introduced into the first stage leach 2 wherein it is partially leached with partially reduced leach liquor obtained from the second stage leach 6. Leaching is carried out at temperatures greater than 80° C. but below the boiling temperature of the liquid (approximately 106° C.).

The first stage leach 2 is followed by a solid-liquid separation device 4 from which the underflow 7 is comprised of partially leached concentrate and the overflow 11 is comprised of a clear solution enriched in copper. In order to achieve rapid settling rates of the solids as well as an overflow solution which is free of solids, it has been found to be necessary to use organic settling aids (flocculants). It has been found that Percol E10 (trade mark) at a rate of 1 mg/liter is a satisfactory flocculant on a cost effectiveness basis.

The partially leached concentrate of the underflow 7 is further leached in a second leaching vessel 6 with regenerated leaching liquid obtained from the anode compartments 16 of electrowinning cells.

The overflow 13 from the second stage leach 4 goes to a solid-liquid separation device 8 from which the underflow 9 consists of a thickened slurry of completely leached concentrate residue and the overflow is the partially reduced leach liquor used for the first stage leach 2.

The thickened leach residue of underflow 9 is filtered in residue filter 34 and washed with a suitable solution such as a barren solution containing 15% by weight HCl to remove entrained leach liquors leaving a final residue suitable for disposal or for recovery of sulfur or contained trace constituents.

The relative proportion of copper leached in each of the first and second stage leaches 2 and 4 can be varied. The only significant parameters in this regard are that the second stage leach residue must be completely leached and the first stage leach overflow solution must be free of ferric and cupric ions.

A balanced circuit may be achieved by adding sufficient new concentrate to the first leach 2 to match the available ferric and cupric ions in the regenerated solution going to the second stage leach from the turboaerator 10. Alternatively to generating all the oxidized species (ferric and cupric) in the turboaerator 10, air may be introduced into the second stage leach 6 so that leaching of the copper minerals and regeneration of leach liquor are occurring at the same time.

The enriched solution from the first stage leach thickener 4 is directed to the cathode compartments of electrolytic cells (electrowinning cells). The anode 16 and cathode 12 compartments of the electrowinning cells (which compartments are shown as separate units in the flow sheet of FIG. 1) are separated by a solution impermeable membrane so that anolyte and catholyte are prevented from mixing. Preventing any mixing of solutions is essential for achieving maximum electrowinning efficiency. A commercially available membrane material known as NAFION (trade mark) (a perfluorosulfonic acid polymer which may be supported by a fluorocarbon polymer fabric) has been found to be suitable for this purpose. In the present system, passage of elements through this membrane has been found to be limited to small (mobile) cations such as hydrogen ions or sodium ions. It has been found that when a cell has a catholyte fully loaded with copper and an anolyte free of copper but fully converted to the ferric state, no inefficiency is observed due to the transport of these ions through the membrane.

The applicants' prior U.S. Pat. No. 4,159,232 indicated the need for chloride salt such as sodium chloride in order to maintain adequate conductivity in the solution. With the present electrolytic cell employing NAFION TM membranes it has been found that the use of sodium chloride, or a like salt, is not necessary and indeed improved results can be achieved by increasing the hydrochloric acid concentration and operating with no sodium chloride present. This is demonstrated by the results of the following set of electrowinning tests carried out with solution generated by leaching of chalcopyrite concentrates.

TABLE 1

| HCl Concentration Molar | Cu Range gpl | Cell Voltage | Rate g/ft./min. | Power kwh/lb. Cu |
|---|---|---|---|---|
| 0.65 (+44 gpl Na) | 28-2 | 1.5 | 0.59 | 0.314 |
| 2.5 | 46-27 | 1.55 | 1.03 | 0.315 |
| 2.5 | 22-10 | 1.55 | 0.86 | 0.341 |
| 2.5 | 10-3 | 1.55 | 0.48 | 0.521 |
| 2.5 | 44-9.5 | 2.0 | 1.14 | 0.566 |
| 1.75 | 28-7 | 1.52 | 0.65 | 0.432 |
| 1.75 | 31-6 | 2.02 | 1.11 | 0.591 |

The influence of high hydrochloric acid concentration on the copper deposition rate is demonstrated to be very beneficial. At the same time, the elimination of sodium chloride from the process streams greatly simplifies the process since the tendency for metal salts (eg. CuCl) to crystallize from solution during leaching or subsequent transport of solutions is decreased and one less salt has to be dealt with in the subsequent rejection of iron from copper depleted solutions.

Figure 2:
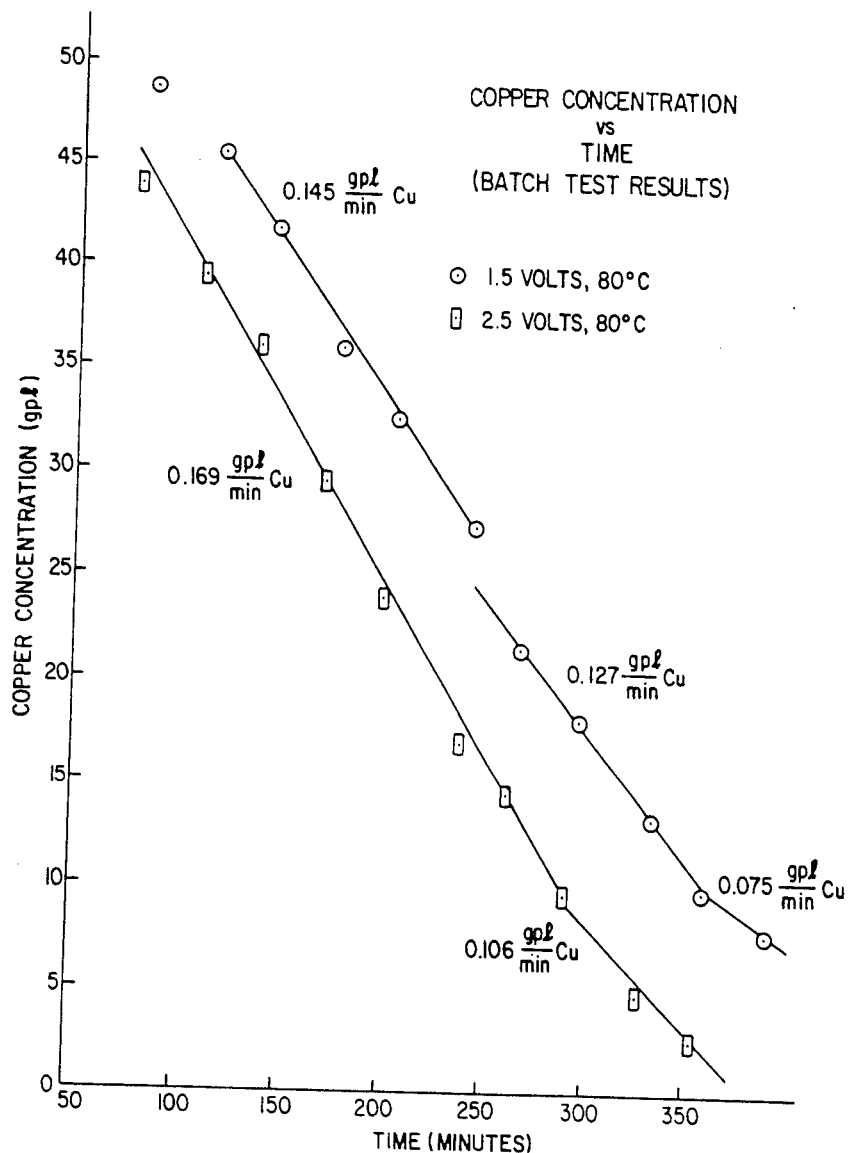
FIG. 2 represents a graphical depiction of a batch test demonstrating copper concentration relative to time utilizing the process.

It is apparent from the tabulated results in Table 1 that the power required to win copper from solution increases as the concentration of copper decreases. It is therefore undesirable to remove all the copper from solution since excessive power costs would be incurred. In addition, the results as shown in FIG. 2 (batch test) and Table 1 reveal that the copper deposition rate decreases as the concentration decreases. Operating at copper concentrations of less than 10 grams per liter results in a disproportionate increase in the required electrode area per unit of copper recovered at these low copper concentrations. Counterbalancing this, however, is the fact that the proportion of the depleted catholyte which goes to the crystallizer 26 for ferrous chloride tetrahydrate crystallization must be completely free of copper. Any copper remaining in this stream would represent a loss of copper and would contaminate the iron product.

Figure 3:
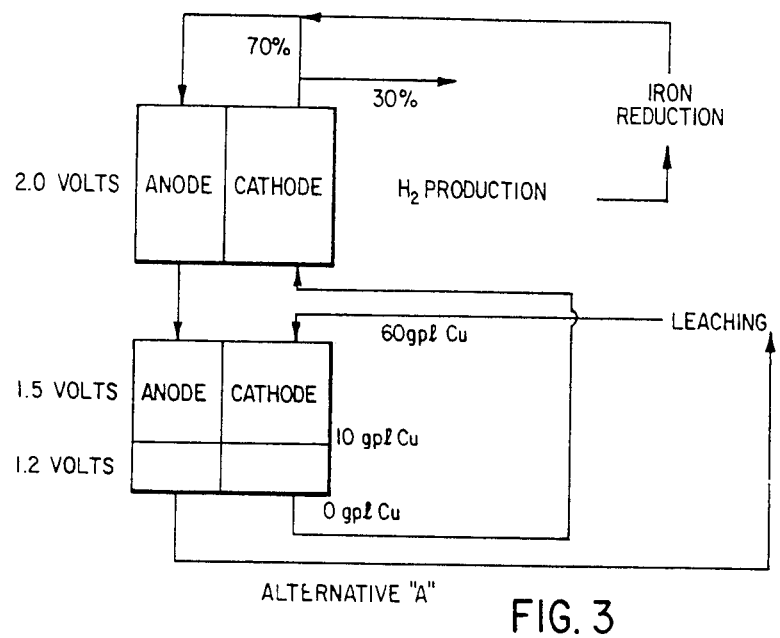
FIG. 3 represents a flow arrangement wherein hydrogen required for iron reduction is generated electrolytically.
Figure 4:
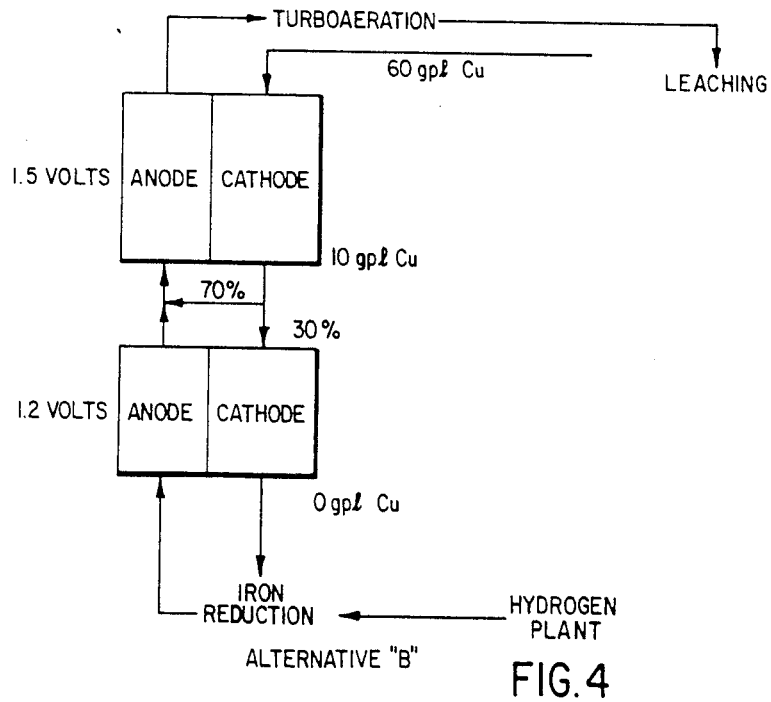
FIG. 4 represents an alternative arrangement wherein hydrogen is produced as separate operation.

A balance must therefore be struck. There are a number of possible cell configurations and operating conditions and costs that can be used to achieve the above objectives. Two possible alternative configurations are shown in FIGS. 3 and 4. FIG. 3 (Alternative A) shows a configuration wherein all copper is electrowon from solution and hydrogen required for iron reduction is generated electrolytically. Two types of cells are illustrated. One type can have cathode compartments with sloping bottoms for copper removal. The second type is used to produce hydrogen and ferric. The hydrogen is drawn off the cathode compartments of the second cell type.

FIG. 4 (Alternative B) shows hydrogen being produced in a separate operation. Ferric oxidation is carried by means of turboaeration. Only one type of cell is required since every cell is producing copper. This means a decreased number of electrowinning cells. The hydrogen required for iron reduction is taken from a hydrogen plant. Such a plant may use natural gas as feedstock. It should be apparent and understood that in each case where an anode or cathode is shown, a multiplicity of cells appropriate for the plant throughout is is being considered.

The copper is electrocrystallized at the cathode in the form of a loosely adherent dendritic growth. The copper growth falls from the cathode or is removed by periodic shaking. The size to which the copper grows before falling from the cathode is dependent on the nature of the cathode material as shown in Table II.

TABLE II

| Influence on Cathode Material on Copper Product | | | |
|---|---|---|---|
| | CUMULATIVE WEIGHT AND RETAINED | | |
| MESH TYLER SERIES | Titanium | Copper | Stainless Steel (Type 317) |
| 4 | | 7.4 | 0.8 |
| 8 | | 13.1 | 2.8 |
| 14 | | 37.4 | 17.0 |
| 28 | 0.1 | 65.8 | 43.9 |
| 48 | 3.4 | 84.7 | 69.2 |
| 100 | 15.2 | 93.4 | 84.4 |
| 200 | 35.6 | 97.2 | 92.5 |
| 325 | 49.3 | | |

The variation in copper product size obtained with the various cathode materials leads to alternate methods of copper product removal from the circuit. The coarse material present with a copper cathode is undesirable in that it indicates a tendency for continued growth and this ultimately could result in damage to the cell membrane. The product from the stainless steel cathode settles rapidly and must be filtered directly. The product from a titanium cathode can be pumped to a thickener prior to being filtered.

The catholyte solution which has been sufficiently depleted in copper goes to a catholyte scrubber 20 wherein the solution is used to absorb hydrochloric acid from gases produced in the iron reduction stage 22. Addition of hydrochloric acid to this stream is beneficial since it is directed to the anode compartment of the electrolytic cells and as previously discussed, increased acid concentration is beneficial to electrowinning efficiency.

Figure 5:
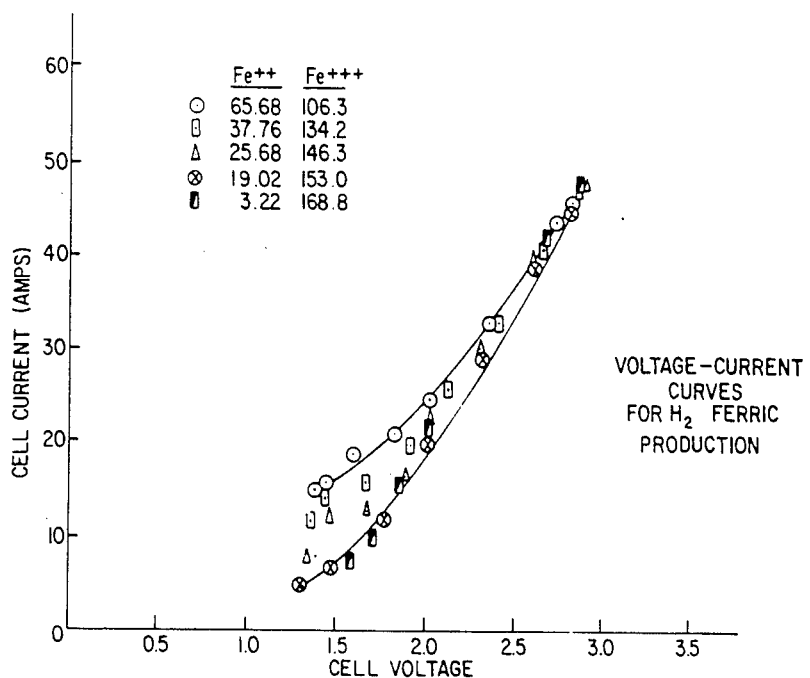
FIG. 5 represents the results of electro-oxidation tests carried out at various cell voltages utilizing the process.

In the anode compartments, ferrous iron is oxidized to the ferric state to balance the electrical requirement for copper reduction at the cathode. Only one-third of the iron is oxidized during copper reduction. The rest of the iron must be oxidized in a separate stage. This oxidation can be carried out in the anode compartment of additional electrowinning cells while hydrogen is produced at the cathode as shown in FIG. 3. FIG. 3 shows these cells being maintained at a potential of 2 volts. The results of electro-oxidation tests carried out at various cell voltages are shown in FIG. 5. It is apparent that as the cell voltage increases the cell current and therefore the rate of ferric production also increase. The production of chlorine at the anode was not detected until less than 10 grams per litre of ferrous remained in solution. The current efficiency for ferric production is therefore 100% until this concentration is reached and the power consumption for ferric production will be directly proportional to the cell voltage. Decreasing the cell voltage to minimize power consumption also decreases the ferric production rate and therefore increases the number of cells required. The optimum cell voltage will therefore be an economic decision based on a balance between both power costs and the cost of an increased number of cells.

Alternatively, the remaining ferrous may be oxidized to the ferric state through the use of turboaeration as illustrated in FIG. 4. Turboaeration is the oxidation of ferrous to ferric brought about by blowing air through the heated anolyte discharge solution while agitating the solution vigorously.

That portion of the catholyte which has been completely stripped of copper in the copper stripper 24 is sent to the crystallizer 26 for the crystallization of $FeCl_2.4H_2O$. While the presence of sodium chloride in solution, such as in U.S. Pat. No. 4,159,232, results in a complex two-stage crystallization procedure, the solution of this process requires only the removal of water for crystallization to occur.

Figure 6:
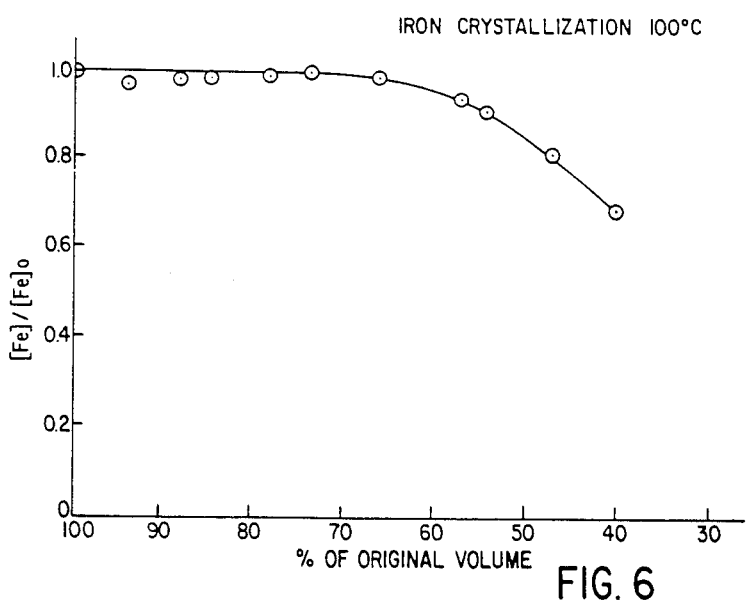
FIG. 6 represents the results obtained by removing water from a stripped catholyte solution.

FIG. 6 shows results obtained by removing water from a stripped catholyte solution when approximately 30% of the volume has been removed as vapour, crystallization begins. Continued removal of vapour results in an increased proportion of the iron becoming crystallized. In actual practice the quantity of solution which goes to the crystallizer 26 is greater than that required for removal of the appropriate amount of iron. The advantage of this is that it provides an outlet for water from the circuit without the loss of dissolved constituents. A recycle stream from the crystallizer 26 carries the excess iron back to join the solution going to the anode compartment 16. The recycle stream is enriched in dissolved species such as HCl.

The ferrous chloride tetrahydrate crystals from the crystallizer 26 are washed in a crystal wash 28 and dried in a crystal drier 30 to the dihydrate state prior to being hydrogen reduced in an iron reductor 22. The hydrogen is obtained from a suitable hydrogen source 32.

Hydrogen reduction has been carried out on pelletized crystals produced from the process solutions. The reduction of pellets was found to be complete after three to four hours reduction at 600° C. The reduced pellets are friable in nature and are readily pulverized and then briquetted. Alternatively, the solution from the copper stripper 24 can be oxidized to produce ferric oxide and recover the hydrogen chloride, such treatment of ferrous chloride liquors being known art in the steelmaking industry.

Figure 8:
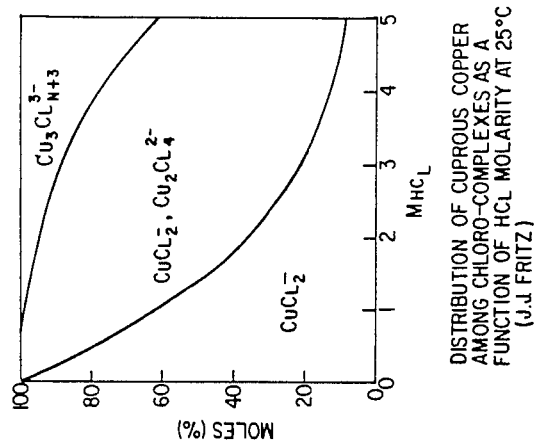
FIG. 8 represents a graph depicting molar concentration relative to distribution of cuprous copper among chloro-complexes as a function of HCl molarity at 25° C.
Figure 7:
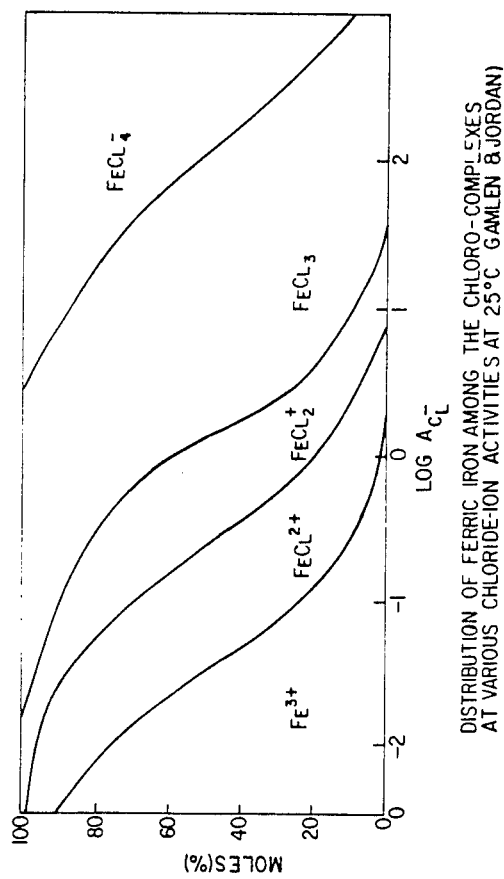
FIG. 7 represents a graph depicting molar concentration relative to distribution of ferric iron among the chloro complexes at various chloride-ion activities at 25° C.

In order to appreciate the characteristics and capabilities of the applicants' improved process, it is necessary to have an understanding of the nature of iron and copper species dissolved in chloride solution. FIGS. 7 and 8, which are based on information obtained from the literature, show respectively the nature of dissolved iron and chloride complexes as a function of chloride ion concentration (activity). It can be seen that in solutions such as those we use in the applicants' process, i.e., 2.5 M HCl and approximately 10 M total chloride activity, copper and iron do not exist as simple ions but in fact exist as neutral or anionic chloride complex species. This characteristic, as the applicants have discovered, can be exploited to separate the anode and cathode compartments of an electrowinning cell by utilizing an appropriate cation exchange membrane.

The anionic copper complexes which enter the cathode compartment are attracted to the cathode where they are reduced to elemental copper. Such complexes are not attracted to the anode and in any case cannot reach the anode since the cation exchange membrane passes only cations.

The ferric ions which are generated at the anode form neutral or anionic complexes. If these complexes were able to migrate to the cathode they would be reduced to the ferrous state which would represent a useless and inefficient reaction. However, the fact that the ferric ions exist as predominantly neutral or anionic complexes prevents such ferric ions from transporting through the membrane.

In the present application, the applicants disclose a substantial improvement in electrowinning performance. This is achieved by preventing any mixing of anolyte and catholyte (that is, no solution transfer) through the use of a solution-impermeable cation exchange membrane. Such an impermeable membrane must be more than a simple physical solution barrier because it must allow for charge transfer to take place so that the anolyte and catholyte compartments do not become charged. Our prior U.S. Pat. No. 4,159,232 does not disclose such a membrane and indeed in the process disclosed in that patent, mixing of the anolyte and the catholyte does take place.

While Kruesi et al., U.S. Pat. No. 3,901,776, briefly discussed earlier, contemplates the use of separator between the anode and cathode of a cell (column 4), it is clear they were thinking only of a physical separator. There is no evidence whatsoever that Kruesi et al. were aware of the existence of these complexes or anticipated the use of a cation exchange membrane to control their movement in an electrowinning cell. Nowhere in the Kruesi et al. patent is there any discussion of chloride ion activity or how it may influence the transport of ions across a membrane or cell separator. Most of the Kruesi et al. patent is preoccupied with the oxidation of ferrous to ferric in preference to cuprous to cupric oxidation. It is debatable whether such preference has any particular value.

The Celgard literature clearly indicates that Celgard films are designed for situations where flow is required. This literature contains statements such as "Celgard 2500 was developed to provide higher flow rates, larger pores, and lower pressure drops" and "These hydrophilic grades have been developed for applications requiring water flow, such as ultrafiltration and battery separator". But nowhere in the Celgard literature are any ion exchange properties alluded to. In contrast the Nafion literature describes the Nafion membrane as a "perfluorinated cation exchange membrane".

The fact that a microporous polypropylene film of the type used by Kruesi et al. will pass ions is demonstrated in the following test:

EXAMPLE 1

A 45 ml sample of solution containing a 60 gpl $Cu^+$ and 140 gpl $Fe^{++}$ was placed on one side of a film of Celgard 3400 (a trade mark for a microporous polypropylene film of the type disclosed by Kruesi et al.). A 500 ml sample of water was placed on the other side of the film. After 72 hours, the solution on each side of the film as analyzed as follows.

Solution side = 5.41 gpl $Cu^+$, 12.65 gpl $Fe^{++}$
Water side = 5.03 gpl $Cu^+$, 11.42 gpl $Fe^{++}$ This analysis clearly shows that $Cu^+$ and $Fe^{++}$ ions passed through the film into the water side in a relatively short time.

At the same time, the level of the water on the solution side had increased relative to the other side indicating that osmosis had occurred.

These data clearly demonstrate, in the applicants' submission, that such a separator will allow the passage of both ions and water.

EXAMPLE 2

To demonstrate the strong differences in characteristics and performance between a membrane with very small holes and a membrane which acts as a chemical ion barrier, the following comparison test has been conducted.

A 25 ml sample containing 40 gpl copper as cuprous chloride and 160 gpl iron as ferrous chloride was placed on one side of film of Celgard 3501. The test was duplicated with a Nafion 415 membrane. A 325 ml sample of water was placed on the other side of each separator. After 6 hours the water adjacent to the Celgard 3501 contained 1.8 gpl Cu and 7.9 gpl Fe. In contrast, the water adjacent to the Nafion 415 contained only 0.04 gpl Cu and 0.11 gpl Fe. This marked difference illustrates the vastly improved ion separation of the Nafion 415 over the Celgard 3501.

The teachings of Kruesi et al. are considered by the applicants to be deficient because while Kruesi et al. recognized that a separator which did not allow free solution flow was important, they failed to teach how an acceptable separation could be achieved. Apart from the ion transport properties discussed above, a Celgard separator has been found to be unsuitable for electrowinning of copper for the type of solution under consideration. After using a Celgard 3400 membrane for 100 hours, it was found to have become embrittled to the point where it was unsuitable for further use. The Celgard 3400 has a thickness of 1 mil. Two other Celgard membranes (K-404-A having a thickness of 15 mils and K-406-A having a thickness of 25 mils) were tested to determine whether increased film thickness would overcome these physical limitations. It was found that these membranes would pass only extremely low currents under normal operating conditions and thus were unsatisfactory.

The problems and shortcomings described above, and as demonstrated by the tests set forth in Examples 1 and 2, are successfully overcome by the applicants' novel process.

In the applicants' process, a true nonsolution transfer-charge transfer membrane is used in the electrowinning cell. The membrane which has been specifically used to demonstrate the viability of the invention is available under the trade mark Nafion. The Nafion membrane is composed of a microporous perfluorosulfonic acid polymer which may be supported by a Teflon (trade mark) fabric for additional mechanical strength. The membrane known by the mark Nafion is a cation exchange membrane which will allow the passage of cations (mobile ions) but will not allow anions or free water molecules to pass through. Although the membrane Nafion is presented as a suitable material, it will be recognized that other cation exchange membranes having similar properties will be equally suitable for the purposes of the invention.

Since the membrane will pass only cations (mobile ions), a sufficient concentration of mobile cations must be present in the anolyte to provide for the transfer of one mole of charge across the membrane. This is achieved by maintaining a high acid level (that is, high $H^+$ concentration) in the anolyte. While in theory, one mole of $H^+$ would be adequate to provide for the removal of one mole of cuprous ($Cu^+$) from the catholyte, in practice the applicants have found that it is advantageous to maintain a base concentration of 1.5 M HCl in the solution with an additional 1.0 M HCl available for carrying the ionic current across the membrane. This high acid concentration helps to maintain high solution conductance. While the anolyte contains a high concentration of ferric ion ($Fe^{++}$), such ions exist as complexes such as $FeCl_4^-$ in solutions containing high chloride concentration and as such cannot pass across the membrane. Other mobile cations such as sodium ($Na^+$) are suitable for carrying ionic current across the membrane but their ionic mobility is lower than that of hydrogen ions and their presence leads to process complications in other parts of the circuit.

The use of high acid concentrations is beneficial also in that it prevents the precipitation of ferric hydroxide in the anolyte. Such precipitation will occur if a substantial portion of the iron is oxidized to ferric and at the same time the hydrogen ion concentration becomes depleted through diffusion across the membrane. It is important to recognize that the function of the hydrogen chloride in the process is only to provide acidity to prevent the hydrolysis of iron and copper and to provide hydrogen ions for ionic current transport across the membrane. The hydrogen chloride is not the active leaching agent, such leaching requiring an oxidizing agent. In the applicants' process, the oxidizing agent, and therefore the active leaching agent, is the ferric ion and to a lesser degree the cupric ion formed as the anodic process during electrowinning. The use of electrowinning solutions with acid concentrations such as those of the claimed process makes the use of the iron removal options proposed by Kruesi et al. impossible in the applicants' process. Iron removal by electrowinning would be prohibitively costly since hydrogen would be evolved at the cathode until all the excess acid had been removed from solution.

Removal of iron from solution by hydrolysis is normally carried out in iron chloride solutions by oxidizing the ferrous to ferric through turboaeration with oxygen according to

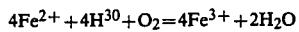

Hydrolysis of the ferric then occurs according to

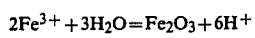

Due to the high acid concentration of the applicants' solutions, the second reaction is suppressed and ferric oxide will not form.

The applicants' prior patent, Bacon et al. (U.S. Pat. No. 4,159,232), teaches that iron can be removed from high acid solutions which have been completely depleted in copper through the crystallization of ferrous chloride tetrahydrate. The crystallized tetrahydrate is subsequently reduced at high temperature with hydrogen to form iron and recover the contained chloride.

If the removal of iron from solution through the production of iron by this route is not economically advantageous, a preferred removal option would be to oxidize the stripped solution at high temperature to produce ferric oxide for disposal according to the reaction:

$$2FeCl_2 + 2H_2O + 1/2O_2 = Fe_2O_3 + 4HCl$$

Such oxidation can be carried out by direct oxidation of the ferrous chloride liquor by spray roasting or by first producing ferrous chloride tetrahydrate crystals and then oxidizing them in a fluidized bed reactor.

The applicants' process also includes a novel method of achieving suitably low silver concentrations in solution. Copper concentrates such as those for which the process has been developed usually contain small amounts of silver. For concentrates containing 28% copper, the silver content may vary widely, for example, from 15 ppm to 200 ppm. During leaching, the silver goes into solution along with the copper. If the silver is not removed from solution, it subsequently is deposited along with the copper.

If a concentrate containing 28% copper and 23.8 ppm silver, for example, is leached and all these values go into solution, the solution would typically contain 50 gpl Cu and 4.25 ppm Ag. If this solution is subjected to electrowinning, the copper product would be essentially 100% copper containing 85 ppm Ag. This result would be achieved with any chloride based process which was used. Such a copper product must be subsequently refined to drop the silver level to a concentration of less than 15 ppm Ag before the copper can be considered as "wirebar grade". It follows that in order for copper produced from a chloride process to contain less than 15 ppm Ag, the solution going to electrowinning must contain less than 0.75 ppm Ag if it contains 50 gpl Cu.

To address this problem, the applicants have developed a novel step for achieving suitably low silver concentrations in solution. Th process involves adding a soluble iodide to the enriched solution from the first stage leach thickener. Addition of this iodide causes cuprous iodide to precipitate. Continued agitation of the solution with the cuprous iodide causes an exchange with the silver in solution to form solid silver iodide. Following an adequate agitation time to allow this reaction to proceed to where an acceptably low silver concentration in solution is achieved a solid-liquid separation is carried out to provide a cuprous iodide-silver iodide precipitate and a solution suitable for electrowinning. The majority of the precipitate is recycled in the circuit to allow the silver concentration of this material to build up. A small percentage of the iodide, proportional to the quantity of silver coming into the process with the new concentrate, is continuously removed to be treated for silver and iodide recovery.

The viability and efficiency of this silver reducing process is demonstrated by the following tests:

EXAMPLE 3

A leach solution containing 65 gpl Cu and 2.88 ppm Ag had 8 gpl NaI added to it. The NaI was added as a 500 gpl solution. After 20 minutes agitation time, the silver concentration in solution was found to be reduced to 0.72 ppm. Precipitation was carried out at 95° C. This is a typical temperature for the solution going from the leaching operation to electrowinning. The precipitation can be carried out at lower temperatures but will require longer agitation times under these conditions.

EXAMPLE 4

The following test was conducted to demonstrate that the recycled cuprous iodide will be effective for silver removal. A leach solution containing 65 gpl Cu and 2.8 ppm Ag was treated with an addition of 10 gpl CuI. The CuI had been prepard by reacting NaI with a CuCl solution containing HCl. The resulting CuI precipitate was filtered out. After 30 minutes agitation time at 95° C. the silver concentration in solution was found to have been reduced to 0.8 ppm.

The foregoing experiments illustrate that the use of a soluble iodide will result in solutions which are of sufficiently low silver content that a wirebar grade copper can be produced by electrowinning. In further experimentation, it has been determined that a minimum iodide addition equivalent to 4 gpl CuI is required under the conditions of temperature and concentration discussed above for our process in order that the precipitation proceed effectively.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. In a novel hydrometallurgical process for the recovery of copper from sulphide copper concentrate containing copper and iron involving the use of electrowinning cells having anolyte and catholyte chambers, the improvement comprising increasing the efficiency of the electrowinning cells by using a solution-impermeable cation exchange membrane to separate the anolyte and the catholyte chambers in the electrowinning cells and operating the anolyte chambers of the cells at hydrogen chloride levels above about 1 Mole H+ to thereby maintain the copper and iron in solution as copper chloride and iron chloride complexes so that they do not pass through the membrane.

2. A process as defined in claim 1 wherein mixing of the anolyte and the catholyte is prevented by a membrane which is substantially impervious to copper chloride and iron chloride complexes but is pervious to hydrogen ions.

3. A process as defined in claim 2 wherein the anolyte and catholyte are substantially free of alkali metal chloride.

4. A process as defined in claim 2 wherein the anolyte and catholyte are substantially free of sodium chloride.

5. A process as defined in claim 1 wherein the solution-impermeable cation exchange membrane is a microporous perfluorosulfonic acid polymer.

6. A process as defined in claim 5 wherein the membrane is supported by a tetrafluorocarbon polymer fabric to provide additional mechanical strength.

7. A process as defined in claim 5 wherein the membrane is identified with the trade mark NAFION.

8. A process as defined in claim 1 wherein the concentration of hydrogen chloride is above about 1.5 Mole of H+.

9. A process as defined in claim 1 wherein the concentration of hydrogen chloride is above about 2.5 Mole of H+.

10. A process as defined in claim 1 wherein the cation exchange membrane is substantially impervious to copper chloride and iron chloride complexes and water molecules but is pervious to mobile cations selected from the group consisting of hydrogen and sodium ions.

11. A process for the recovery of copper utilizing electrowinning cells comprising leaching copper concentrate in first and second stages, the leaching in the first stage being done with a partially reduced leach liquor obtained from the second stage; separating the concentrate obtained from the first stage in a solid-liquid separator, the partially leached solids being directed to the second leaching stage, the liquid from the separator being directed to the catholyte compartment of an electrowinning cell; leaching the solids in the second leaching stage with regenerated leaching liquid obtained from the anolyte compartment of the electrowinning cell, the anolyte and catholyte compartments being separated by a membrane which is impermeable to copper chloride and iron chloride complexes but is permeable to hydrogen ions the anolyte compartment being operated at hydrogen chloride levels above about 1 mole H+; and separating the concentrate obtained from the second stage in a second solid-liquid separator and filtering and washing the solids residue from the separator.

12. A process as defined in claim 11 wherein the leaching liquid obtained from the anolyte compartment of the electrowinning cell is directed through an oxidation turboaerator before passing to the second stage leach.

13. A process as defined in claim 11 wherein the residue of the second stage leach is substantially free of copper, and the liquid from the first stage leach is substantially free of cupric and ferric ions.

14. A process as defined in claim 11 wherein no significant amount of sodium chloride is present in the anolyte or the catholyte.

15. A process as defined in claim 11 wherein a portion of catholyte liquid is directed to a copper stripper, subsequently to a ferrous chloride tetrahydrate crystallizer, subsequently to a crystal wash, subsequently to a crystal drier and finally to an iron reductor.

16. A process as defined in claim 11 wherein a portion of catholyte liquid is directed to a copper stripper, subsequently to a ferrous chloride tetrahydrate crystallizer, and subsequently to an oxidation unit.

17. A process as defined in claim 11 wherein a portion of catholyte liquid is directed to a copper stripper and subsequently to an oxidation unit.

18. A process as defined in claim 11 wherein a soluble iodide is added to the enriched solution from the first stage leach thickener.

19. A process as defined in claim 18 wherein the enriched solution to which the soluble iodide has been added is agitated for a length of time sufficient to precipitate silver iodide from solution to a point where the concentration of silver remaining in solution is sufficiently low that the copper obtained from the process is of "wirebar grade".

20. A process as defined in claim 19 wherein a majority of the silver iodide precipitate is recycled in the circuit.

21. A process as defined in claim 18 wherein the soluble iodide is sodium iodide.

* * * * *